(12) United States Patent
Qian et al.

(10) Patent No.: US 12,511,061 B2
(45) Date of Patent: Dec. 30, 2025

(54) DATA STORAGE METHOD AND APPARATUS, ELECTRONIC DEVICE, AND STORAGE MEDIUM

(71) Applicants: Beijing Volcano Engine Technology Co., Ltd., Beijing (CN); Lemon Inc., Grand Cayman (KY)

(72) Inventors: Han Qian, Beijing (CN); Kai Xie, Singapore (SG)

(73) Assignees: Beijing Volcano Engine Technology Co., Ltd., Beijing (CN); Lemon Inc., Grand Cayman (KY)

( * ) Notice: Subject to any disclaimer, the term of this patent is extended or adjusted under 35 U.S.C. 154(b) by 16 days.

(21) Appl. No.: 18/432,697

(22) Filed: Feb. 5, 2024

(65) Prior Publication Data

US 2024/0272814 A1 Aug. 15, 2024

(30) Foreign Application Priority Data

Feb. 10, 2023 (CN) .......................... 202310135520.2

(51) Int. Cl.
G06F 3/06 (2006.01)

(52) U.S. Cl.
CPC .......... *G06F 3/0631* (2013.01); *G06F 3/0613* (2013.01); *G06F 3/0643* (2013.01); *G06F 3/067* (2013.01)

(58) Field of Classification Search
CPC .... G06F 3/0631; G06F 3/0613; G06F 3/0643; G06F 3/067; G06F 3/061; G06F 3/0644; G06F 3/0671; G06F 16/278; Y20D 10/00
See application file for complete search history.

(56) References Cited

U.S. PATENT DOCUMENTS 9,239,838 B1 * 1/2016 Peddy ................. G06F 16/119
9,384,227 B1 * 7/2016 Xiao ................... G06F 16/278
(Continued)

FOREIGN PATENT DOCUMENTS

CN 114661707 A 6/2022

OTHER PUBLICATIONS

B. Nicolae, "Scalable Multi-Versioning Ordered Key-Value Stores with Persistent Memory Support," 2022 IEEE International Parallel and Distributed Processing Symposium (IPDPS), Lyon, France, 2022, pp. 93-103, (Year: 2022).*
(Continued)

*Primary Examiner* — Khoa D Doan
*Assistant Examiner* — Julian S Mendel
(74) *Attorney, Agent, or Firm* — BakerHostetler

(57) ABSTRACT

The present disclosure provides a data storage method, an apparatus, an electronic device and a storage medium. The data storage method includes: acquiring at least one piece of feature data to be stored in a target storage system, wherein each piece of the feature data has a corresponding primary key respectively; for each piece of the feature data, determining, from a plurality of first time partitions corresponding to the target storage system, a target time partition to which a data occurrence time of the feature data belongs; and allocating, based on a total number of buckets corresponding to the target time partition and a primary key corresponding to the feature data, a corresponding bucket to the feature data, and storing the feature data in a storage space that is associated with the corresponding bucket of the feature data.

19 Claims, 6 Drawing Sheets acquiring at least one piece of feature data to be stored in a target storage system, in which each piece of feature data includes at least one sub-feature data, and each piece of feature data has a corresponding primary key respectively — S101 for each piece of feature data, determining, from a plurality of first time partitions corresponding to the target storage system, a target time partition to which a data occurrence time of the feature data belongs, in which each first time partition corresponds to a corresponding number of buckets, and each bucket is associated with one storage space of the target storage system; the number of buckets corresponding to each first time partition is determined by festival attribute information corresponding to the first time partition, or the number of buckets corresponding to each first time partition is determined by data storage capacity before the first time partition — S102 allocating, based on the number of buckets corresponding to the target time partition and a primary key corresponding to the feature data, a corresponding bucket to the feature data, and storing the feature data in a storage space that is associated with the corresponding bucket of the feature data — S103

(56) References Cited

U.S. PATENT DOCUMENTS

| | | | |
|---|---|---|---|
| 11,222,066 B1 | 1/2022 | Batsakis et al. | |
| 2013/0346328 A1* | 12/2013 | Agle | G06Q 10/0635 |
| | | | 705/317 |
| 2014/0258650 A1* | 9/2014 | Vishniac | G06F 3/064 |
| | | | 711/159 |
| 2018/0089188 A1* | 3/2018 | Kharisma | G06F 16/2477 |
| 2019/0155750 A1* | 5/2019 | Wang | G06F 12/0811 |
| 2021/0326183 A1* | 10/2021 | Leu | G06F 9/5066 |
| 2022/0269727 A1* | 8/2022 | Batsakis | G06F 16/2255 |
| 2023/0315785 A1 | 10/2023 | Batsakis et al. | |

OTHER PUBLICATIONS

European Patent Application No. 24155277.7; Extended Search Report; dated Jun. 12, 2024; 11 pages.
Zhu et al.; "K-way Fast Approximate Spectral Clustering"; IEEE $3^{rd}$ Information Technology, Networking, Electronic and Automation Control Conf.; 2019; p. 1616-1620.

\* cited by examiner

```
┌─────────────────────────────────────────────────────────────────────┐
│ acquiring at least one piece of feature data to be stored in a target storage │
│ system, in which each piece of feature data includes at least one sub-feature │ ─ S101
│     data, and each piece of feature data has a corresponding primary key      │
│                                 respectively                                  │
└─────────────────────────────────────────────────────────────────────┘
                                     ▼
┌─────────────────────────────────────────────────────────────────────┐
│     for each piece of feature data, determining, from a plurality of first time │
│ partitions corresponding to the target storage system, a target time partition to │
│ which a data occurrence time of the feature data belongs, in which each first │
│    time partition corresponds to a corresponding number of buckets, and each    │ ─ S102
│   bucket is associated with one storage space of the target storage system; the │
│    number of buckets corresponding to each first time partition is determined by │
│    festival attribute information corresponding to the first time partition, or the │
│    number of buckets corresponding to each first time partition is determined by │
│              data storage capacity before the first time partition              │
└─────────────────────────────────────────────────────────────────────┘
                                     ▼
┌─────────────────────────────────────────────────────────────────────┐
│   allocating, based on the number of buckets corresponding to the target time │ ─ S103
│ partition and a primary key corresponding to the feature data, a corresponding │
│   bucket to the feature data, and storing the feature data in a storage space that │
│           is associated with the corresponding bucket of the feature data           │
└─────────────────────────────────────────────────────────────────────┘
```

FIG. 1

DATA STORAGE METHOD AND APPARATUS, ELECTRONIC DEVICE, AND STORAGE MEDIUM

CROSS-REFERENCE TO RELATED APPLICATION

The present application claims priority of the Chinese Patent Application No. 202310135520.2, filed on Feb. 10, 2023, the disclosure of which is incorporated herein by reference in its entirety.

TECHNICAL FIELD

The present disclosure relates to the field of data storage technology, and specifically, to a data storage method and apparatus, an electronic device, and a storage medium.

BACKGROUND

With the development of computer technology, more and more data need to be stored. For example, in actual applications, it is necessary to store usage behavior data of a user during a process of using an application for subsequent use.

However, in the process of storing data, current data storage systems usually need to perform a global index on the data in the storage system to distinguish whether the current data to be stored is to write new data or to update the data, and the indexing service is usually limited by the traffic, which affects the throughput performance of writing data, resulting in low data storage efficiency.

SUMMARY

Embodiments of the present disclosure at least provide a data storage method and apparatus, an electronic device, and a storage medium, which can improve data storage efficiency.

The present disclosure provides a data storage method, which includes:
  acquiring at least one piece of feature data to be stored in a target storage system, each piece of the feature data includes at least one sub-feature data, and each piece of the feature data has a corresponding primary key respectively;
  for each piece of the feature data, determining, from a plurality of first time partitions corresponding to the target storage system, a target time partition to which a data occurrence time of the feature data belongs, each of the first time partitions corresponds to a corresponding number of buckets, each bucket is associated with one storage space of the target storage system; a total number of buckets corresponding to each of the first time partitions is determined by corresponding festival attribute information of the first time partition, or the total number of buckets corresponding to each of the first time partitions is determined by data storage capacity before the first time partition; and
  allocating, based on a total number of buckets corresponding to the target time partition and a primary key corresponding to the feature data, a corresponding bucket to the feature data, and storing the feature data in a storage space that is associated with the corresponding bucket of the feature data.

In the embodiments of the present disclosure, the target storage system corresponds to a plurality of first time partitions, and each of the first time partitions corresponds to a corresponding number of buckets, so during the process of data storage, the target time partition to which the feature data belongs can first be determined based on the data occurrence time of the feature data, and then, based on the number of buckets corresponding to the target time partition and the primary key corresponding to the feature data, the corresponding bucket is allocated to each feature data; and then the feature data can be stored in a corresponding storage space in the target storage system without the need for a global index, that is, the throughput performance of writing data can be improved through append writing, thereby improving the data storage efficiency.

In addition, since the number of buckets corresponding to each of the first time partitions is determined by the corresponding festival attribute information of the first time partition, or the number of buckets corresponding to each of the first time partitions is determined by the data storage capacity before the first time partition, and thus the evolution of the number of buckets can be realized, that is, the corresponding number of buckets can be adjusted according to the actual predicted demand, thereby reducing the occurrence of data overflow or a large amount of remaining storage space due to the setting of too many or too few buckets.

In a possible implementation, before acquiring the at least one piece of feature data to be stored in the target storage system, the corresponding number of buckets of each of the first time partitions is determined through the following steps:
  in a case that a current time satisfies a preset condition, dividing a first preset time period after the current time into at least one second time partition;
  setting a corresponding number of buckets for each second time partition according to corresponding festival attribute information of each second time partition, and determining the second time partition as the first time partition; or
  setting a corresponding number of buckets for each second time partition according to data storage capacity of a second preset time period before each second time partition, and determining the second time partition as the first time partition.

In the embodiments of the present disclosure, in the case that the current time satisfies the preset condition, the first preset time period after the current time can be automatically divided into at least one second time partition, and the corresponding number of buckets are set for each second time partition; in this way, the number of buckets can be automatically configured, and the configured number of buckets can satisfy a corresponding data storage requirement, which can not only improve the efficiency of setting the number of buckets, but also improve the applicability of the data storage method.

In a possible implementation, allocating, based on the total number of buckets corresponding to the target time partition and the primary key corresponding to the feature data, the corresponding bucket to the feature data, includes:
  performing, based on the total number of buckets corresponding to the target time partition, a modulo operation on the primary key of the feature data to obtain an identity identifier of the corresponding bucket of the feature data; and allocating, based on the identity identifier, the corresponding bucket for the feature data from a corresponding number of buckets of the target time partition.

In the embodiments of the present disclosure, by performing the modulo operation on the primary key of the feature data, and allocating the corresponding bucket to the feature data according to the operation processing result, the feature data with the same primary key can be divided into the same bucket, which can improve the data storage accuracy and the data storage efficiency.

In a possible implementation, the method further includes:
- for each piece of the feature data, in a case that the feature data does not carry the data occurrence time, performing a global index on buckets configured by the target storage system based on the primary key of the feature data, to determine whether a target bucket corresponding to the primary key of the feature data exists among the buckets configured by the target storage system; and
- in a case that the target bucket corresponding to the feature data exists among the buckets configured by the target storage system, storing the feature data into a storage space that is associated with the target bucket.

In the embodiments of the present disclosure, in the case that the feature data does not carry the data occurrence time, the data can also be stored through the global index, that is, the global index is used as a last and practicable way. In this way, even in the case that the feature data does not carry the data occurrence time, data storage can be realized, which helps to improve the applicability of the data storage method.

In a possible implementation, the method further includes:
- in a case that the target bucket corresponding to the feature data does not exist among the buckets configured by the target storage system, storing the feature data into a storage space that is associated with a first bucket; the first bucket includes a bucket that does not store data among the buckets configured by the target storage system or a newly created bucket.

In the embodiments of the present disclosure, in the case that the target bucket corresponding to the feature data does not exist among the buckets configured by the target storage system, then the feature data is stored in a new bucket, so that the data storage accuracy can be ensured.

In a possible implementation, after storing the feature data in the storage space that is associated with the corresponding bucket of the feature data, the method further includes:
- acquiring a data reading task, and determining, based on the data reading task, at least one bucket in which target sub-feature data to be read is located;
- dividing the data reading task into a plurality of sub-data reading tasks based on the at least one bucket in which the target sub-feature data is located; and
- for each of the sub-data reading tasks, performing a merged reading of data by employing a K-way merge algorithm.

In the embodiments of the present disclosure, the data reading task is divided according to buckets, and for each of the sub-data reading tasks, the merged reading of data is performed by employing the K-way merge algorithm, which can improve data reading efficiency.

In a possible implementation, feature data stored in a same bucket during a same period fall into a same data file, each data file has a corresponding primary key, and for each of the sub-data reading tasks, performing the merged reading of data by employing the K-way merge algorithm, includes:
- for each of the sub-data reading tasks, determining at least one data file to which corresponding target sub-feature data of the sub-data reading task belongs, sorting the at least one data file based on the primary key of the at least one data file, and performing, by employing the K-way merge algorithm, a merged reading of data in at least one data file that is sorted.

In the embodiments of the present disclosure, sorting the at least one data file based on the primary key of at least one data file corresponding to the sub-data reading task facilitates the merging of data files with the same primary key, which in turn facilitates the enhancement of data reading efficiency.

In a possible implementation, sorting the at least one data file based on the primary key of the at least one data file, includes:
- during a process of sorting the at least one data file, in a case that two or more data files with a same primary key are existed, sorting the data files with the same primary key according to an order of writing time of the data files.

In the embodiments of the present disclosure, in the case that two or more data files with the same primary key are existed, the data files with the same primary key are sorted according to the order of the writing time of the data files. In this way, the data files with the same primary key can also be sorted, which will help improve the accuracy of sorting.

In a possible implementation, feature data stored in a same bucket during a same period fall into a same data file, a plurality of sub-feature data corresponding to each data file are stored in columns, and for each of the sub-data reading tasks, performing the merged reading of data by employing the K-way merge algorithm, includes:
- for each of the sub-data reading tasks, determining at least one data file to which corresponding target sub-feature data of the sub-data reading task belongs, determining target column data from the at least one data file respectively, and performing, by employing a K-way merge algorithm, a merged reading of data in the target column data that corresponds to the at least one data file respectively.

In the embodiments of the present disclosure, since the feature data in the data file is stored in columns, that is, column clipping is supported, during the process of merged reading, the required target sub-feature data can just be merged, thereby improving the data reading efficiency.

In a possible implementation, feature data stored in a same bucket during a same period fall into a same data file, and the method further includes:
- performing data merging on data files in the target storage system according to a first range to obtain at least one first merged data file; and/or
- performing data merging on the data files in the target storage system according to a second range to obtain at least one second merged data file, in which the second range is greater than the first range.

In the embodiments of the present disclosure, after the data is stored, the data can be merged according to the first range (small range) or the second range (large range) according to actual needs. In this way, it can be read directly during the subsequent process of data reading, there is no need to perform the process of merged reading, which helps to improve the efficiency of subsequent data reading.

In a possible implementation, the feature data includes usage behavior data of a user during a process of using a target application, the usage behavior data includes sample data and/or sample label data, and the sample data and the sample label data are used to train a model.

In the embodiments of the present disclosure, since the feature data includes the usage behavior data of the user during the process of using the target application, it is possible to acquire and store the usage behavior data of the user, as well as train the model after reading the data, and predict the user's behavior through the trained model, which in turn provides better services for the user and help improve the user experience.

The present disclosure provides a data storage apparatus, which includes:
- a data acquisition processor, configured to acquire at least one piece of feature data to be stored in a target storage system, each piece of the feature data includes at least one sub-feature data, and each piece of the feature data has a corresponding primary key respectively;
- a partition determination processor, configured to, for each piece of the feature data, determine, from a plurality of first time partitions corresponding to the target storage system, a target time partition to which a data occurrence time of the feature data belongs, each of the first time partitions corresponds to a corresponding number of buckets, each bucket is associated with one storage space of the target storage system; a total number of buckets corresponding to each of the first time partitions is determined by corresponding festival attribute information of the first time partition, or the total number of buckets corresponding to each of the first time partitions is determined by data storage capacity before the first time partition; and
- a data storage processor, configured to allocate, based on a total number of buckets corresponding to the target time partition and a primary key corresponding to the feature data, a corresponding bucket to the feature data, and store the feature data in a storage space that is associated with the corresponding bucket of the feature data.

In a possible implementation, the feature data includes usage behavior data of a user during a process of using a target application, the usage behavior data includes sample data and/or sample label data, and the sample data and the sample label data are used to train a model.

In a possible implementation, the partition determination processor is further configured to:
- in a case that a current time satisfies a preset condition, dividing a first preset time period after the current time into at least one second time partition;
- setting a corresponding number of buckets for each second time partition according to corresponding festival attribute information of each second time partition, and determining the second time partition as the first time partition; or
- setting a corresponding number of buckets for each second time partition according to data storage capacity of a second preset time period before each second time partition, and determining the second time partition as the first time partition.

In a possible implementation, the data storage processor is further configured to:
- performing, based on the total number of buckets corresponding to the target time partition, a modulo operation on the primary key of the feature data to obtain an identity identifier of the corresponding bucket of the feature data; and allocating, based on the identity identifier, the corresponding bucket for the feature data from a corresponding number of buckets of the target time partition.

In a possible implementation, the data storage processor is further configured to:
- for each piece of the feature data, in a case that the feature data does not carry the data occurrence time, perform a global index on buckets configured by the target storage system based on the primary key of the feature data, to determine whether a target bucket corresponding to the primary key of the feature data exists among the buckets configured by the target storage system; and
- in a case that the target bucket corresponding to the feature data exists among the buckets configured by the target storage system, store the feature data into a storage space that is associated with the target bucket.

In a possible implementation, the data storage processor is further configured to:
- in a case that the target bucket corresponding to the feature data does not exist among the buckets configured by the target storage system, store the feature data into a storage space that is associated with a first bucket; the first bucket includes a bucket that does not store data among the buckets configured by the target storage system or a newly created bucket.

In a possible implementation, the apparatus further includes:
- a task acquisition processor, configured to acquire a data reading task, and determining, based on the data reading task, at least one bucket in which target sub-feature data to be read is located;
- a task division processor, configured to divide the data reading task into a plurality of sub-data reading tasks based on the at least one bucket in which the target sub-feature data is located; and
- a data reading processor, configured to, for each of the sub-data reading tasks, perform a merged reading of data by employing a K-way merge algorithm.

In a possible implementation, feature data stored in a same bucket during a same period fall into a same data file, each data file has a corresponding primary key, and the data reading processor is specifically configured to:
- for each of the sub-data reading tasks, determine at least one data file to which corresponding target sub-feature data of the sub-data reading task belongs, sort the at least one data file based on the primary key of the at least one data file, and perform, by employing the K-way merge algorithm, a merged reading of data in at least one data file that is sorted.

In a possible implementation, the data reading processor is specifically configured to:
- during a process of sorting the at least one data file, in a case that two or more data files with a same primary key are existed, sorting the data files with the same primary key according to an order of writing time of the data files.

In a possible implementation, feature data stored in a same bucket during a same period fall into a same data file, a plurality of sub-feature data corresponding to each data file are stored in columns, and for each of the sub-data reading tasks, the data reading processor is specifically configured to:
- for each of the sub-data reading tasks, determine at least one data file to which corresponding target sub-feature data of the sub-data reading task belongs, determine target column data from the at least one data file respectively, and perform, by employing a K-way merge algorithm, a merged reading of data in the target column data that corresponds to the at least one data file respectively.

In a possible implementation, the apparatus further includes a data merging processor, the data merging processor is configured to:

perform data merging on data files in the target storage system according to a first range to obtain at least one first merged data file; and/or perform data merging on the data files in the target storage system according to a second range to obtain at least one second merged data file, in which the second range is greater than the first range.

The present disclosure provides an electronic device, including: a processor, a memory and a bus, the memory stores machine-readable instructions executable by the processor, and when the electronic device is running, the processor and the memory communicate with each other through the bus, and the machine-readable instructions, when executed by the processor, perform the above-described data storage method.

The present disclosure provides a computer-readable storage medium, a computer program is stored on the computer-readable storage medium, and the computer program, when executed by a processor, perform the above-described data storage method.

BRIEF DESCRIPTION OF DRAWINGS

To describe the technical solutions in the embodiments of the present disclosure more clearly, the accompanying drawings required in the description of the embodiments will be described briefly below. The accompanying drawings, which are hereby incorporated in and constitute a part of the present description, illustrate embodiments of the present disclosure, and together with the description, serve to explain the technical solutions of the embodiments of the present disclosure. It is to be understood that the following drawings illustrate only certain embodiments of the present disclosure and are not intended to limit the scope of protection. Other accompanying drawings can also be derived from these drawings by those ordinarily skilled in the art without creative efforts.

FIG. 1 illustrates a flowchart of a data storage method provided by some embodiments of the present disclosure;

DETAILED DESCRIPTION

Figure 2:
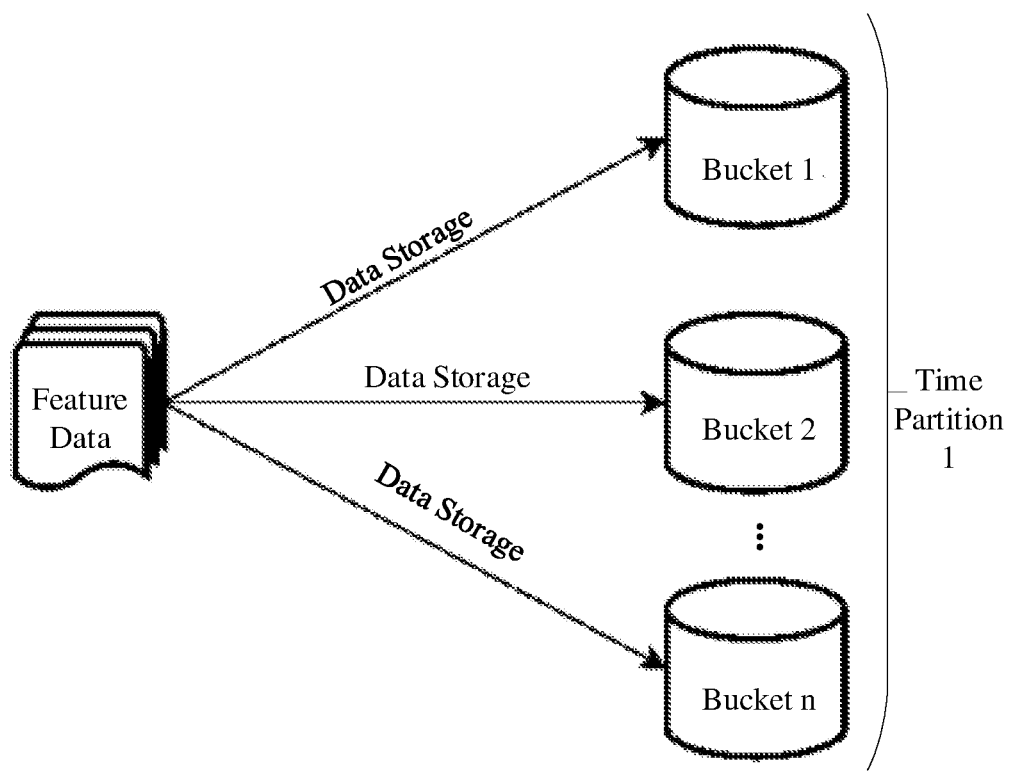
FIG. 2 illustrates a schematic diagram of a process of allocating buckets for feature data provided by some embodiments of the present disclosure.

In order to make the purpose, technical solutions and advantages of the embodiments of the present disclosure more clear, the technical solutions in the embodiments of the present disclosure will be clearly and completely described below with reference to the accompanying drawings in the embodiments of the present disclosure. Obviously, the described embodiments are only some, but not all, of the embodiments of the present disclosure. The components of the embodiments of the present disclosure generally described and illustrated in the drawings herein may be arranged and designed in a variety of different configurations. Therefore, the following detailed description of the embodiments of the present disclosure provided in the drawings is not intended to limit the scope of the present disclosure, but rather to represent selected embodiments of the present disclosure. Based on the embodiments of the present disclosure, all other embodiments obtained by those skilled in the art without any creative efforts shall fall within the scope of protection of the present disclosure.

It should be noted that similar reference numbers and letters indicate similar items in the following drawings. Therefore, once an item is defined in one drawing, it does not require further definition or explanation in subsequent figures.

The term "and/or" in the present disclosure only describes an association relationship, indicating that three relationships can exist. For example, A and/or B can mean: A exists separately, A and B exist simultaneously, and B exists separately. In addition, the term "at least one" herein means any one of a plurality or any combination of at least two of a plurality. For example, including at least one of A, B, and C may mean including any one or more elements selected from the set consisting of A, B, and C.

Research has found that current data storage systems, in the process of storing data, usually require global indexing of the data in the storage system to distinguish whether the current data to be stored is the written new data or the updated data, and the indexing service is usually limited by the traffic, which affects the throughput performance of writing data, resulting in low data storage efficiency.

Based on the above research, embodiments of the present disclosure provide a data storage method. Firstly, at least one piece of feature data to be stored in a target storage system is acquired, each piece of the feature data includes at least one sub-feature data, and each piece of the feature data has a corresponding primary key respectively; then for each piece of the feature data, a target time partition to which a data occurrence time of the feature data belongs is determined from a plurality of first time partitions corresponding to the target storage system; each of the first time partitions corresponds to a corresponding number of buckets, each bucket is associated with one storage space of the target storage system; the number of buckets corresponding to each of the first time partitions is determined by corresponding festival attribute information of the first time partition, or the number of buckets corresponding to each of the first time partitions is determined by data storage capacity before the first time partition; finally, based on the number of buckets corresponding to the target time partition and a primary key corresponding to the feature data, a corresponding bucket is allocated to the feature data, and the feature data is stored in a storage space that is associated with the corresponding bucket of the feature data.

In the embodiments of the present disclosure, the target storage system corresponds to a plurality of first time partitions, and each of the first time partitions corresponds to a corresponding number of buckets, so during the process of data storage, the target time partition to which the feature data belongs can first be determined based on the data occurrence time of the feature data, and then, based on the number of buckets corresponding to the target time partition and the primary key corresponding to the feature data, the corresponding bucket is allocated to each feature data; and then the feature data can be stored in a corresponding storage space in the target storage system without the need for a global index, that is, the throughput performance of writing data can be improved through append writing, thereby improving the data storage efficiency.

In addition, since the number of buckets corresponding to each of the first time partitions is determined by the corresponding festival attribute information of the first time partition, or the number of buckets corresponding to each of the first time partitions is determined by the data storage capacity before the first time partition, and thus the evolution of the number of buckets can be realized, that is, the corresponding number of buckets can be adjusted according to the actual predicted demand, thereby reducing the probability of the occurrence of data overflow or a large amount of remaining storage space due to the setting of too many or too few buckets.

In order to facilitate understanding of the embodiments of the present disclosure, firstly, the execution subject of the data storage method provided by the embodiments of the present disclosure is introduced in detail. The execution subject of the data storage method provided by the embodiments of the present disclosure is an electronic device. In this embodiment, the electronic device is a server. The server may be an independent physical server, a server cluster or distributed system composed of a plurality of physical servers, or a cloud server that provides basic cloud computing services such as cloud services, cloud databases, cloud computing, cloud storage, big data and artificial intelligence platforms. In other embodiments, the electronic device may also be a terminal device. The terminal device may be a mobile device, a user terminal, a handheld device, a computing device, a wearable device, etc. In addition, the data storage method may also be implemented by a processor calling computer-readable instructions that are stored in a memory.

The data storage method provided by the embodiments of the present disclosure will be described in detail below with reference to the drawings. Refer to FIG. 1, which is a flowchart of a data storage method provided by the embodiments of the present disclosure, the data storage method includes the following steps S101~S102.

S101: acquiring at least one piece of feature data to be stored in a target storage system, in which each piece of the feature data includes at least one sub-feature data, and each piece of the feature data has a corresponding primary key respectively.

In some embodiments, a distributed framework may be used to load at least one piece of feature data that needs to be stored. In the case that each piece of data includes a plurality of sub-feature data, there is a preset association relationship between the plurality of sub-feature data. For example, the plurality of sub-feature data may be usage behavior data of the same user within the same time range. Specifically, the plurality of sub-feature data may include types of data content, user names, user attributes, user behaviors, etc. The primary key, also called the primary keyword, is a unique identifier of each piece of the feature data. That is, different feature data can be distinguished through the primary key of each piece of the feature data.

Optionally, the feature data may be usage behavior data of a user during a process of using a target application, the usage behavior data includes sample data and/or sample label data, and the sample data and the sample label data are used to train a model. The trained model may be used to predict a target usage behavior of the user and display content matching the target usage behavior for the user based on the target usage behavior. In other embodiments, the feature data may also be user data that needs to be retained based on General Data Protection Regulation (GDPR) compliance requirements.

It should be noted that after training the model through the new sample data and sample label data, if the model performance is improved, the newly added sample data and sample label data are retained; and if the model performance is reduced, the newly added sample data and sample label data are deleted, thus saving the corresponding storage space.

Illustratively, the target application may be a short video application, a news discovery application, a shopping application, etc., which is not specifically limited here. The sample data refers to data used to characterize user behavior, and the sample label data refers to data used to characterize user behavior results. The content of the sample data and the content of the sample label data are different for different types of applications.

For example, for news applications, the sample data may be related data such as the browsing content and browsing time for the user browsing news. Correspondingly, the sample label data may be collection data, like data or dislike data for a certain news content. For shopping applications, the sample data may be consumption data for the user searching for or watching certain types of shopping content, and correspondingly, the sample label data may be data related to whether the user places an order to purchase or adds a certain item to a shopping cart. For short video applications, the sample data may be data on how long the user has watched a certain category of video or a certain video, and the sample label data may be data on whether the user is interested in the video, etc.

It should be noted that the occurrence time of sample data is usually earlier than the occurrence time of sample label data. In addition, the above examples of sample data and sample label data are only illustrative. In other embodiments, for different types of applications, the sample data and the sample label data may also be determined according to actual application requirements. In addition, the above classification of target applications is only an example. Some applications may correspond to several different categories. For example, some short video applications actually have shopping functions and may also be shopping applications.

S102: for each piece of the feature data, determining, from a plurality of first time partitions corresponding to the target storage system, a target time partition to which a data occurrence time of the feature data belongs, in which each of the first time partitions corresponds to a corresponding number of buckets, and each bucket is associated with one storage space of the target storage system; the number of buckets corresponding to each of the first time partitions is determined by corresponding festival attribute information of the first time partition, or the number of buckets corresponding to each of the first time partitions is determined by data storage capacity before the first time partition.

For example, each of the first time partitions corresponds to a time period, the length of the time period may be set according to actual needs, and the length of the time period corresponding to each of the first time partitions may be the same or different. In addition, compared to a current time for acquiring at least one piece of the feature data to be stored in the target storage system, the time period corresponding to each of the first time partitions may include a time period before the current time, a time period to which the current time belongs, and a time period after the current time.

For example, the bucket is used as a logical concept to logically divide the data that needs to be stored. Each bucket corresponds to one storage space of the target storage system, and the size of the storage space corresponding to each bucket is not specifically limited and can be determined according to needs.

Specifically, the number of buckets corresponding to each of the first time partitions can be determined through the following steps (1) to (2):

(1) in the case that the current time satisfies a preset condition, dividing a first preset time period after the current time into at least one second time partition;

(2) setting a corresponding number of buckets for each second time partition according to corresponding festival attribute information of each second time partition, and determining the second time partition as the first time partition; or setting a corresponding number of buckets for each second time partition according to data storage capacity of a second preset time period before each second time partition, and determining the second time partition as the first time partition.

Illustratively, a preset number of buckets may be set in advance for each second time partition according to the predicted demand. For example, the time period corresponding to the second time partition may be set to half a month, so that the number of buckets corresponding to the second time partition (1st to 15th) is set on the 1st of each month, and the number of buckets corresponding to the second time partition (16th to 30th) is set on the 15th of each month. It should be noted that the second time partition is the time after the current time.

Of course, the time period corresponding to the second time partition may also be one day or shorter, without any specific limitation. For example, in the case that the number of users using shopping applications increases significantly on a certain day (such as a shopping festival), the number of buckets corresponding to the second time partition corresponding to the date may be increased. In this way, when user traffic increases significantly, concurrency can be increased by increasing the number of buckets without spending a lot of resources and time migrating data that has already been written.

In the embodiments of the present disclosure, not only the corresponding number of buckets can be allocated to different time partitions based on the size of the time-estimated data volume, but also the number of buckets for the time partition to be allocated can be determined based on the data volume of the previous time period. In this way, the number of buckets can be automatically configured, and the configured number of buckets can satisfy a corresponding data storage requirement, which can not only improve the efficiency of setting the number of buckets, but also improve the applicability of the data storage method.

In addition, the data occurrence time refers to the time when the data is generated. For example, during a process of a user using a target application, the target application pushes an advertisement to the user, the push time of the advertisement, that is, the time when the advertisement occurs, and the subsequent data for whether the advertisement is clicked to watch, whether an order is placed, etc. will carry the time when the advertisement occurs.

S103: allocating, based on the number of buckets corresponding to the target time partition and a primary key corresponding to the feature data, a corresponding bucket to the feature data, and storing the feature data in a storage space that is associated with the corresponding bucket of the feature data.

In some embodiments, as shown in FIG. 2, for each piece of the feature data, a modulo operation may be performed on the primary key of the feature data to obtain an identity identifier of the corresponding bucket of the feature data, and a corresponding bucket is allocated to the feature data based on the identity identifier. Specifically, the primary key of the feature data may be converted into a number, and the number is divided by the preset number (such as 1000) of buckets corresponding to the target time partition, and the remainder may be served as the identity identifier of the bucket. For example, after performing the modulo operation, bucket 1 is allocated to feature data 1, bucket 2 is allocated to feature data 2, bucket 3 is allocated to feature data 3, and so on.

In some embodiments, for each piece of the feature data, in the case that the feature data does not carry the data occurrence time, a global index may be performed on buckets configured by the target storage system based on the primary key of the feature data, to determine whether a target bucket corresponding to the primary key of the feature data exists among the buckets configured by the target storage system; and in the case that the target bucket corresponding to the feature data exists among the buckets configured by the target storage system, the feature data is stored into a storage space that is associated with the target bucket.

In the embodiments of the present disclosure, in the case that the feature data does not carry the data occurrence time, the data may also be stored through the global index, that is, the global index is used as a last and practicable way. In this way, even in the case that the feature data does not carry the data occurrence time, data storage can be realized, which helps to improve the applicability of the data storage method.

In addition, in the case that the target bucket corresponding to the feature data does not exist among the buckets configured by the target storage system, the feature data may be stored into a storage space that is associated with a first bucket; and the first bucket includes a bucket that does not store data among the buckets configured by the target storage system or a newly created bucket. For example, if it is determined through the global index that there is no target bucket corresponding to the feature data among the configured buckets, the feature data may be stored in an empty bucket, and in the case that there is no empty bucket, a new bucket may be created. The empty bucket means that the storage space that is associated with the bucket does not store any data; in this way, the accuracy of the data storage can be ensured.

Optionally, for some types of feature data (such as advertising feature data), if the feature data does not carry the data occurrence time, the data occurrence time of the feature data may also be determined through the primary key of the feature data. For example, the data occurrence time corresponding to the feature data may be found through a global index of a hash map based on the primary key of the feature data.

Figure 3:
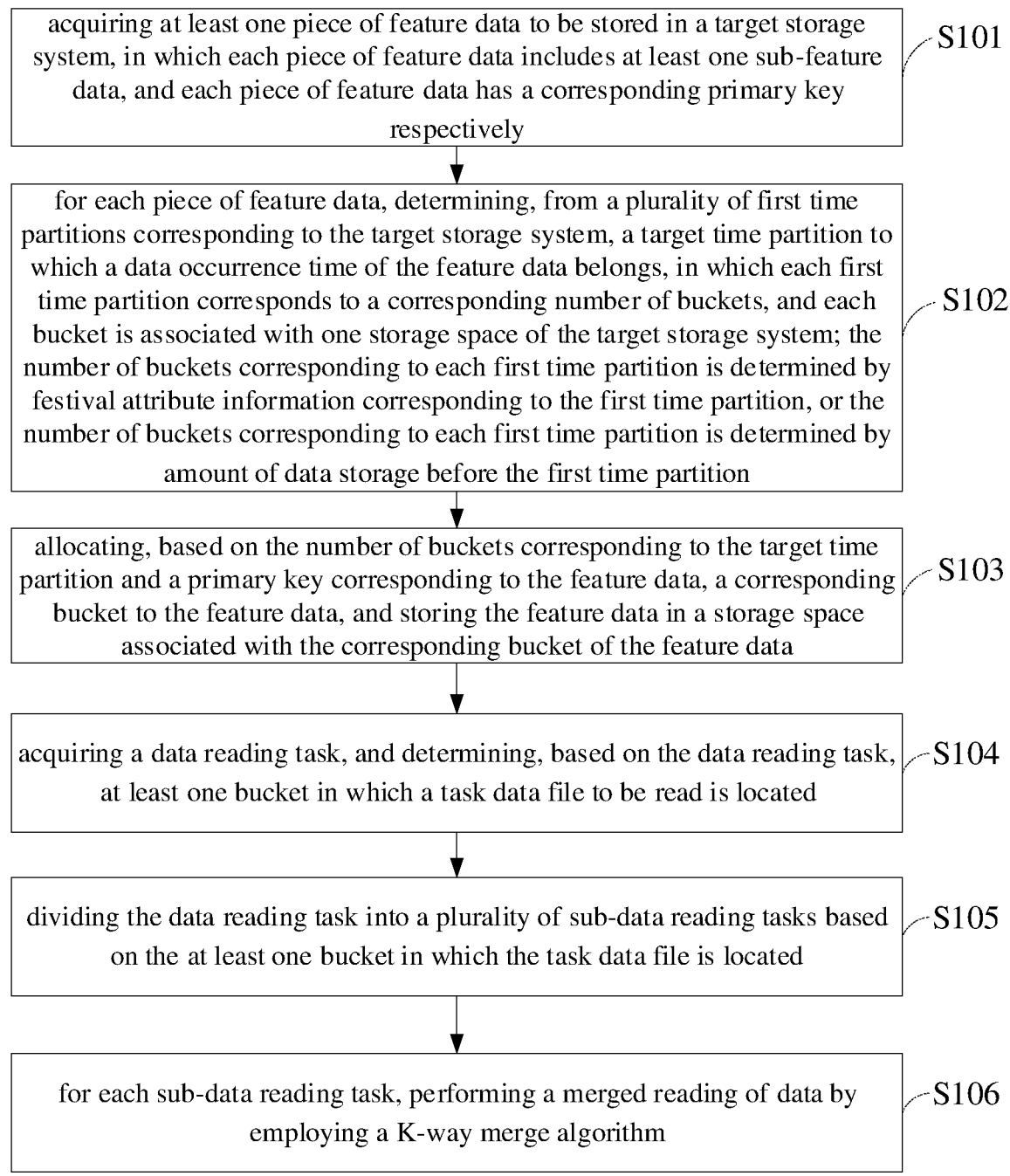
FIG. 3 illustrates a flowchart of another data storage method provided by some embodiments of the present disclosure.

It should be understood that after the feature data is stored, the feature data stored in the same bucket during the same period fall into the same data file, and each data file has a corresponding primary key. When training a model, it is necessary to read the feature data required for training from the target storage system, therefore, referring to FIG. 3, which is a flowchart of another data storage method provided by the embodiments of the present disclosure, what is different from the data storage method described in FIG. 1 is that the following steps S104~S106 are included after step S103.

S104: acquiring a data reading task, and determining, based on the data reading task, at least one bucket in which a task data file to be read is located.

Illustratively, after acquiring the data reading task, at least one bucket in which the target sub-feature data to be read is located may be determined based on the data reading task, and the data reading task may be set by the user, for example, which sub-feature data need to be read may be determined based on user-determined predicates (words corresponding to relevant sub-feature data) or time partitions.

It should be understood that since a plurality of feature data written to the same bucket in the same time period (same batch) falls into the same data file, and as the time when the feature data are written to the target storage system are different, the feature data with the same primary key falls into different data files. Therefore, when reading data, after determining the target data file to which the target sub-feature data that needs to be read belongs, the target sub-feature data with the same primary key in a plurality of target data files corresponding to the same bucket may be merged.

S105: dividing the data reading task into a plurality of sub-data reading tasks based on the at least one bucket in which the task data file is located.

Figure 4:
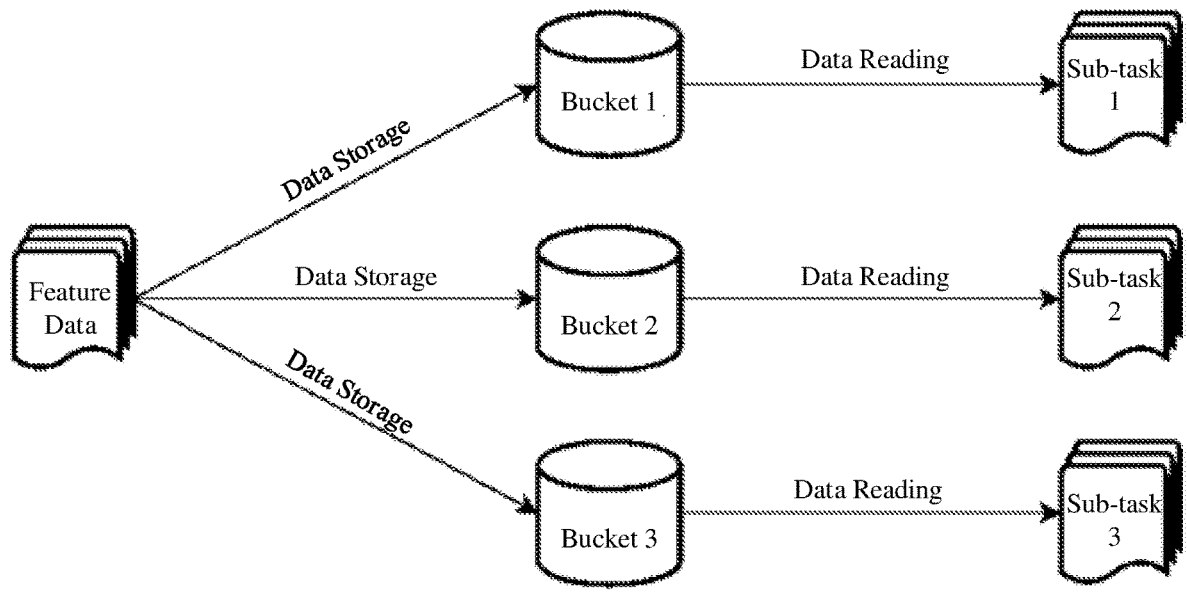
FIG. 4 illustrates a schematic diagram of a process of dividing the data reading task provided by some embodiments of the present disclosure.

Illustratively, as shown in FIG. 4, after determining at least one bucket in which the target sub-feature data is located, the data reading task may be divided into a plurality of sub-data reading tasks based on at least one bucket in which the target sub-feature data is located. For example, if it is determined that the target sub-feature data that needs to be read falls into bucket 1, bucket 2 and bucket 3, respectively, the data reading task may be divided in units of buckets, that is, a reading task corresponding to the target sub-feature data of each bucket is determined to be a sub-data reading task, and thus, bucket 1 corresponds to sub-task 1, bucket 2 corresponds to sub-task 2, and bucket 3 corresponds to sub-task 3.

Of course, in other embodiments, the data reading tasks may also be divided according to other methods. For example, according to time partitions, the reading tasks of the target sub-feature data corresponding to a plurality of buckets under the same time partition are determined as one sub-data reading task.

S106: for each of the sub-data reading tasks, performing a merged reading of data by employing a K-way merge algorithm.

Illustratively, for each of the sub-data reading tasks (for example, for sub-task 1), a K-way merge algorithm may be employed to perform merged reading. In this way, when reading data, there is no need to load all data files into a memory at the same time, and thus there is no performance degradation caused by data overflow to disk.

Specifically, for each of the sub-data reading tasks, at least one data file to which the corresponding target sub-feature data of the sub-data reading task belongs may be first determined, and then at least one data file is sorted based on the primary key of at least one data file, and then the merged reading is performed, by employing a K-way merge algorithm, for data in at least one data file that is sorted.

Optionally, during the process of sorting at least one data file, in the case that two or more data files with the same primary key are existed, the data files with the same primary key are sorted according to an order of writing time of the data files. In this way, the accuracy of data reading can be ensured.

In some embodiments, a plurality of sub-feature data corresponding to each data file are stored in columns, and for each of the sub-data reading tasks, performing the merged reading of data by employing the K-way merge algorithm, includes: for each of the sub-data reading tasks, determining at least one data file to which corresponding target sub-feature data of the sub-data reading task belongs, determining target column data from at least one data file respectively, and performing, by employing the K-way merge algorithm, a merged reading of data in the target column data that corresponds to at least one data file respectively. That is, since the sub-feature data in the data file supports column clipping, during the process of the merged reading, only the required target columns may be merged. For example, if the data file includes tens of thousands of columns of data, and the data reading only needs three hundred columns, in this case, only the sub-feature data of these three hundred target columns may be merged while reading, which can improve the efficiency of data reading.

It should be noted that, during the process of merged reading of the sub-feature data, if one sub-feature data is updated several times, the last updated sub-feature data may be served as the output (result), or the first written sub-feature data may be served as the output, which is depended on the actual situation.

It can be understood that after the feature data is stored in the target storage system and before reading data, in order to improve the efficiency of data reading, the stored feature data may also be merged. Therefore, in some embodiments, the method further includes: performing data merging on feature data in the target storage system according to a first range to obtain at least one first merged data file, in which the first range is smaller than a preset range. For example, the feature data stored each day may be merged in the time unit of a day, or files may be merged in the unit of a bucket, that is, for the feature data in the target storage system, a small range of merging may be performed to obtain at least one first merged data file. In this way, when reading data, if the target sub-featured data that needs to be read belongs to the first merged data file, it can be read directly without the need for merging, thereby improving the efficiency of data reading. It should be noted that if the target sub-feature data that need to be read are distributed in different first merged data files, the different first merged data files need to be merged and then read.

Of course, in other embodiments, the feature data in the target storage system may also be merged according to a second range to obtain at least one second merged data file; and the second range is greater than the first range. For example, the feature data files stored for each month or quarter may be merged in the unit of a month or a quarter to obtain at least one second merged data file In the embodiments of the present disclosure, since the target storage system can further merge the stored feature data, the efficiency of subsequent data reading can be improved while providing more options for subsequent data reading can be provided. For example, for database queries, a large-range merging may be performed after a few hours or days of data storage, and the layout of data files may be rewritten (such as Z-Order to speed up queries); if the data files are no longer sorted by primary keys, the data reading process is transformed from the K-way merge algorithm to a Hash-Join algorithm, thus the data reading performance is still guaranteed to be high in this case; after a large-range merging, the number of subsequent updates is greatly reduced (it is assumed here that the major updates occur in the most recent, before the large-range merging), so that it can be basically all placed in a memory.

Those skilled in the art may understand that in the above-mentioned methods of specific embodiments, the writing order of respective steps does not mean a strict execution order and does not constitute any limitation on the implementation process. The specific execution order of respective steps should be determined based on function and possible internal logic of respective steps. In addition, various embodiments may be combined with each other to form different technical solutions.

Based on the same technical concept, the embodiments of the present disclosure further provide a data storage apparatus corresponding to the data storage method. Since the principle of solving the problem of the apparatus in the embodiments of the present disclosure is similar to the above-mentioned data storage method of the embodiments of the present disclosure, the implementation of the apparatus may refer to the implementation of the method, and the repeated parts will not be repeated.

Figure 5:
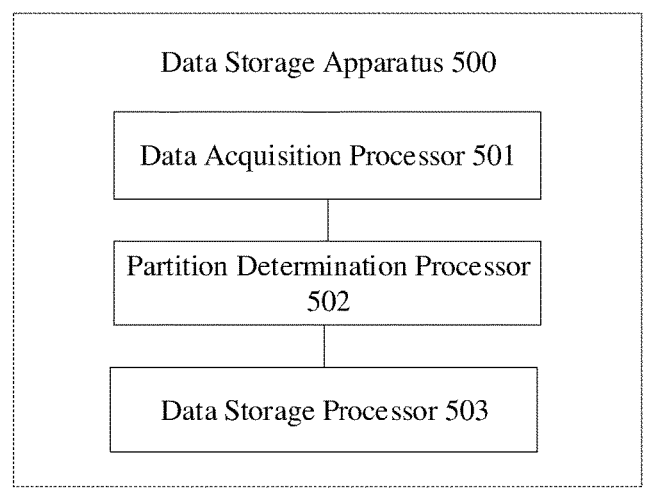
FIG. 5 illustrates a schematic diagram of a structure of a data storage apparatus provided by some embodiments of the present disclosure.

Referring to FIG. 5, which is a schematic diagram of a data storage apparatus 500 provided by the embodiments of the present disclosure, the apparatus includes:

a data acquisition processor 501, which is configured to acquire at least one piece of feature data to be stored in a target storage system, in which each piece of the feature data includes at least one sub-feature data, and each piece of the feature data has a corresponding primary key respectively;

a partition determination processor 502, which is configured to, for each piece of the feature data, determine, from a plurality of first time partitions corresponding to the target storage system, a target time partition to which a data occurrence time of the feature data belongs, in which each of the first time partitions corresponds to a corresponding number of buckets, and each bucket is associated with one storage space of the target storage system; the number of buckets corresponding to each of the first time partitions is determined by corresponding festival attribute information of the first time partition, or the number of buckets corresponding to each of the first time partitions is determined by data storage capacity before the first time partition; and a data storage processor 503, which is configured to allocate, based on the number of buckets corresponding to the target time partition and a primary key corresponding to the feature data, a corresponding bucket to the feature data, and store the feature data in a storage space that is associated with the corresponding bucket of the feature data.

In a possible implementation, the feature data includes usage behavior data of a user during a process of using a target application, the usage behavior data includes sample data and/or sample label data, and the sample data and the sample label data are used to train a model.

In a possible implementation, the partition determination processor 502 is further configured to:

in the case that a current time satisfies a preset condition, divide a first preset time period after the current time into at least one second time partition;

set a corresponding number of buckets for each second time partition according to corresponding festival attribute information of each second time partition, and determine the second time partition as the first time partition;

or set a corresponding number of buckets for each second time partition according to data storage capacity of a second preset time period before each second time partition, and determine the second time partition as the first time partition.

In a possible implementation, the data storage processor 503 is specifically configured to:

perform, based on the number of buckets corresponding to the target time partition, a modulo operation on the primary key of the feature data to obtain an identity identifier of the corresponding bucket of the feature data; and allocate, based on the identity identifier, a corresponding bucket for the feature data from a corresponding number of buckets of the target time partition.

In a possible implementation, the data storage processor 503 is further configured to:

for each piece of the feature data, in the case that the feature data does not carry the data occurrence time, perform a global index on buckets configured by the target storage system based on the primary key of the feature data, to determine whether a target bucket corresponding to the primary key of the feature data exists among the buckets configured by the target storage system; and in a case that the target bucket corresponding to the feature data exists among the buckets configured by the target storage system, store the feature data into a storage space that is associated with the target bucket.

In a possible implementation, the data storage processor 503 is further configured to:

in the case that the target bucket corresponding to the feature data does not exist among the buckets configured by the target storage system, store the feature data into a storage space that is associated with a first bucket, in which the first bucket includes a bucket that does not store data among the buckets configured by the target storage system or a newly created bucket.

Figure 6:
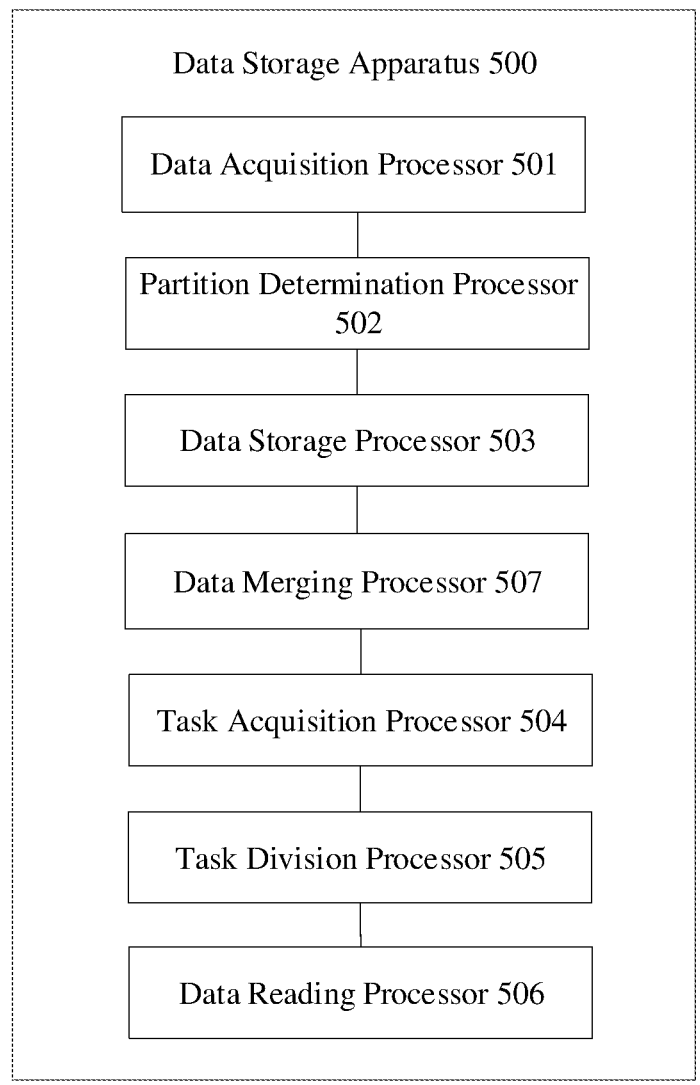
FIG. 6 illustrates a schematic diagram of a structure of another data storage apparatus provided by some embodiments of the present disclosure.

In a possible implementation, as shown in FIG. 6, the apparatus further includes:

a task acquisition processor 504, which is configured to acquire a data reading task, and determine, based on the data reading task, at least one bucket in which target sub-feature data to be read is located;

a task division processor 505, which is configured to divide the data reading task into a plurality of sub-data reading tasks based on at least one bucket in which the target sub-feature data is located;

and a data reading processor 506, which is configured to, for each of the sub-data reading tasks, perform a merged reading of data by employing a K-way merge algorithm.

In a possible implementation, feature data stored in the same bucket during the same period fall into the same data file, each data file has a corresponding primary key, and the data reading processor 506 is specifically configured to:

for each of the sub-data reading tasks, determine at least one data file to which corresponding target sub-feature data of the sub-data reading task belongs, sort at least one data file based on a primary key of at least one data file, and perform, by employing a K-way merge algorithm, a merged reading of data in at least one data file that is sorted.

In a possible implementation, the data reading processor 506 is specifically configured to:

during the process of sorting at least one data file, in the case that two or more data files with the same primary key are existed, sort the data files with the same primary key according to an order of writing time of the data files.

In a possible implementation, feature data stored in the same bucket during the same period fall into the same data file, a plurality of sub-feature data corresponding to each data file are stored in columns, and the data reading processor 506 is specifically configured to:

for each of the sub-data reading tasks, determine at least one data file to which corresponding target sub-feature data of the sub-data reading task belongs, determine target column data from the at least one data file respectively, and perform, by employing a K-way merge algorithm, a merged reading of data in the target column data that corresponds to the at least one data file respectively.

In a possible implementation, the apparatus further includes a data merging processor 507, and the data merging processor 507 is configured to:

perform data merging on data files in the target storage system according to a first range to obtain at least one first merged data file;

and/or perform data merging on the data files in the target storage system according to a second range to obtain at least one second merged data file, in which the second range is greater than the first range.

The descriptions of the processing flow of the processors in the apparatus and the interaction flow between the processors may be referred to the relevant descriptions in the above-mentioned method embodiments, and will not be described in detail herein.

Figure 7:
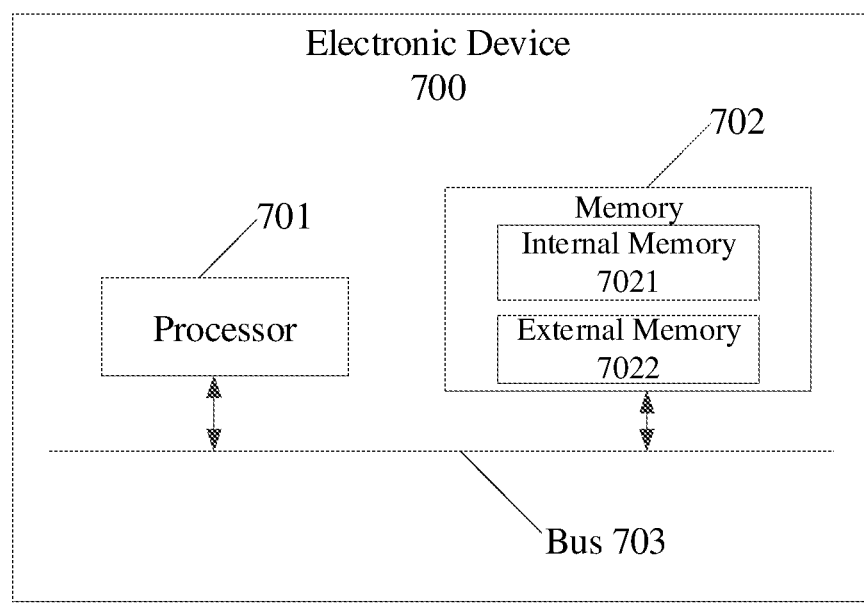
FIG. 7 illustrates a schematic diagram of an electronic device provided by some embodiments of the present disclosure.

Based on the same technical concept, the embodiments of the present disclosure further provide an electronic device. Referring to FIG. 7, which is a schematic diagram of a structure of an electronic device 700 provided by the embodiments of the present disclosure, the electronic device 700 includes a processor 701, a memory 702 and a bus 703. The memory 702 is configured to store execution instructions, including a memory 7021 and an external memory 7022; the memory 7021 here is also called an internal memory, which is configured to temporarily store the operation data in the processor 701 and the data that is exchanged with the external memory 7022 such as a hard disk, and the processor 701 exchanges data with the external memory 7022 through the memory 7021.

In the embodiments of the present disclosure, the memory 702 is specifically configured to store application code for executing the solutions of the present disclosure, and is controlled by the processor 701 for execution. That is, when the electronic device 700 is running, the processor 701 and the memory 702 communicate with each other through the bus 703, so that the processor 701 executes the application code stored in the memory 702, and thus executes the method described in any of the above-mentioned embodiments.

The memory 702 may be, but is not limited to, a random access memory (RAM), a read only memory (ROM), a programmable read-only memory (PROM), an erasable programmable read-only memory (EPROM), and an electric erasable programmable read-only memory (EEPROM), etc.

The processor 701 may be an integrated circuit chip with signal processing capability. The above-mentioned processor may be a general-purpose processor, including a central processing unit (CPU), a network processor (NP), etc., and may also be a digital signal processor (DSP), an application specific integrated circuit (ASIC), a field programmable gate array (FPGA) or other programmable logic devices, discrete gate or transistor logic devices, or discrete hardware components. The processor can implement or execute the methods, steps, and logical block diagrams disclosed in the embodiments of the present disclosure. The general-purpose processor may be a microprocessor or the processor may also be any conventional processor, etc.

It should be understood that the structure illustrated in the embodiment of the present disclosure does not constitute a specific limitation on the electronic device 700. In other embodiments of the present disclosure, the electronic device 700 may include more or less components than shown in the figures, or some components may be combined, some components may be separated, or some components may be arranged differently. The components illustrated may be implemented in hardware, software, or a combination of software and hardware.

The embodiments of the present disclosure further provide a computer-readable storage medium, a computer program is stored on the computer-readable storage medium, and the computer program, when executed by a processor, perform the steps of the data storage method in the above-mentioned method embodiments. For example, the storage medium may be a volatile or non-volatile computer-readable storage medium.

The embodiments of the present disclosure further provide a computer program product. The computer program product carries program code, and instructions included in the program code can be used to execute the steps of the data storage method in the above-mentioned method embodiments. For details, please refer to the above-mentioned method embodiments, which will not be described in detail herein.

For example, the above-mentioned computer program product may be specifically implemented by hardware, software or a combination thereof. In an optional embodiment, the computer program product is embodied as a computer storage medium. In another optional embodiment, the computer program product is embodied as a software product, such as a Software Development Kit (SDK), etc.

Those skilled in the art can clearly understand that for the convenience and simplicity of description, the specific working processes of the systems and apparatuses described above can be referred to the corresponding processes in the above-mentioned method embodiments, and will not be described again herein. In the several embodiments provided in the present disclosure, it should be understood that the disclosed systems, apparatuses and methods can be implemented in other ways. The apparatus embodiments as described above are only schematic, for example, the division of the units may be logical functional division; in actual implementation, there may be other division modes, for another example, a plurality of units or components may be combined or integrated into another system, or some features may be ignored or not executed. On the other hand, the coupling or direct coupling or communication connection displayed or discussed between each other may be indirect coupling or communication connection through some interfaces, apparatuses, or units, which may be in a form of electrical, mechanical or other forms.

The above-mentioned units illustrated as separate components may be, or may not be physically separated, and the components displayed as units may be, or may not be, physical units, that is, they may be at one place, or may also be distributed to a plurality of network units. Some or all of the units may be selected according to actual needs to achieve the purpose of the solutions of the present embodiment.

In addition, the respective functional units in the respective embodiments of the present disclosure may be integrated in one processing unit, or each unit may physically exist separately, or two or more units may be integrated in one unit.

In the case that the functions are implemented in a form of software functional unit and sold or used as an independent product, they may be stored in a non-volatile computer-readable storage medium that is executable by a processor. Based on such understanding, the technical solutions of the present disclosure, in essence, or the part that contributes to the prior art, or all or part of the technical solutions, may be embodied in a form of a software product; the computer software product is stored in a storage medium and includes several instructions so that a computer device (which may be a personal computer, a server, or a network device, etc.) to execute all or part of steps of the methods according to the respective embodiments of the present disclosure. The above-mentioned storage medium includes a USB flash disk, a removable hard disk, a Read-Only Memory, a Random Access Memory, a magnetic disk or an optical disk, and various other media that can store program codes.

Finally, it should be noted that the above-mentioned embodiments are only specific implementations of the present disclosure to illustrate the technical solutions of the present disclosure rather than to limit them, and the protection scope of the present disclosure is not limited thereto. Although the present disclosure has been described in detail with reference to the above-mentioned embodiments, those of ordinary skill in the art should understand that, within the scope of the technology disclosed in the present disclosure, any person of skill familiar with the technical field can still modify or easily think of changes to the technical solutions recorded in the above-mentioned embodiments, or make equivalent substitutions for some of the technical features therein; and these modifications, changes or substitutions, which do not detach the essence of the corresponding technical solutions from the spirit and scope of the technical solutions of the embodiments of the present disclosure, shall be covered within the protection scope of the present disclosure. Therefore, the protection scope of the present disclosure should be determined by the protection scope of the claims.

The invention claimed is:

1. A data storage method, comprising:
determining a number of buckets based on estimating a data volume for each of a plurality of time partitions and allocating the number of buckets in advance for each time partition based on the estimated data volume, wherein each bucket is associated with one storage space of a target storage system;
acquiring at least one piece of feature data to be stored in the target storage system, wherein each piece of the feature data comprises at least one sub-feature data, the at least one sub-feature data comprises usage behavior data of a user using an application, and each piece of the feature data has a corresponding primary key that is a unique identifier of each piece of the feature data;
for each piece of the feature data, determining, from the plurality of time partitions, a target time partition to which an occurrence time of the feature data belongs; and
allocating, based on a total number of buckets preset for the target time partition and a primary key corresponding to the feature data, a corresponding bucket to the feature data, and storing the feature data in a storage space that is associated with the corresponding bucket.

2. The method according to claim 1, further comprising:
in a case that a current time satisfies a preset condition, dividing a first preset time period after the current time into the plurality of time partitions; and
setting a corresponding number of buckets for each time partition according to corresponding festival attribute information of each time partition, or setting a corresponding number of buckets for each time partition according to data storage capacity of a second preset time period before each time partition.

3. The method according to claim 1, wherein allocating, based on the total number of buckets corresponding to the target time partition and the primary key corresponding to the feature data, the corresponding bucket to the feature data, comprises:
performing, based on the total number of buckets corresponding to the target time partition, a modulo operation on the primary key of the feature data to obtain an identity identifier of the corresponding bucket of the feature data; and
allocating, based on the identity identifier, the corresponding bucket for the feature data from a corresponding number of buckets of the target time partition.

4. The method according to claim 1, further comprising:
for each piece of the feature data, in a case that the feature data does not carry the occurrence time, performing a global index on buckets configured by the target storage system based on the primary key of the feature data, to determine whether a target bucket corresponding to the primary key of the feature data exists among the buckets configured by the target storage system; and
in a case that the target bucket corresponding to the feature data exists among the buckets configured by the target storage system, storing the feature data into a storage space that is associated with the target bucket.

5. The method according to claim 4, further comprising:
in a case that the target bucket corresponding to the feature data does not exist among the buckets configured by the target storage system, storing the feature data into a storage space that is associated with a first bucket,
wherein the first bucket comprises a bucket that does not store data among the buckets configured by the target storage system or a newly created bucket.

6. The method according to claim 1, wherein after storing the feature data in the storage space that is associated with the corresponding bucket of the feature data, the method further comprises:
acquiring a data reading task, and determining, based on the data reading task, at least one bucket in which target sub-feature data to be read is located;
dividing the data reading task into a plurality of sub-data reading tasks based on the at least one bucket in which the target sub-feature data is located; and
for each of the sub-data reading tasks, performing a merged reading of data by employing a K-way merge algorithm.

7. The method according to claim 6, wherein feature data stored in a same bucket during a same period fall into a same data file, each data file has a corresponding primary key, and for each of the sub-data reading tasks, performing the merged reading of data by employing the K-way merge algorithm, comprises:

for each of the sub-data reading tasks, determining at least one data file to which corresponding target sub-feature data of the sub-data reading task belongs, sorting the at least one data file based on the primary key of the at least one data file, and performing, by employing the K-way merge algorithm, a merged reading of data in at least one data file that is sorted.

8. The method according to claim 7, wherein sorting the at least one data file based on the primary key of the at least one data file, comprises:

during a process of sorting the at least one data file, in a case that two or more data files with a same primary key are existed, sorting the data files with the same primary key according to an order of writing time of the data files.

9. The method according to claim 6, wherein feature data stored in a same bucket during a same period fall into a same data file, a plurality of sub-feature data corresponding to each data file are stored in columns, and for each of the sub-data reading tasks, performing the merged reading of data by employing the K-way merge algorithm, comprises:

for each of the sub-data reading tasks, determining at least one data file to which corresponding target sub-feature data of the sub-data reading task belongs, determining target column data from the at least one data file respectively, and performing, by employing the K-way merge algorithm, a merged reading of data in the target column data that corresponds to the at least one data file respectively.

10. The method according to claim 1, wherein feature data stored in a same bucket during a same period fall into a same data file, and the method further comprises:

performing data merging on data files in the target storage system according to a first range to obtain at least one first merged data file; and/or performing data merging on the data files in the target storage system according to a second range to obtain at least one second merged data file, in which the second range is greater than the first range.

11. The method according to claim 1, wherein the usage behavior data comprises sample data and sample label data, and the sample data and the sample label data are used to train a model.

12. An electronic device, comprising a processor, a memory and a bus, wherein the memory stores machine-readable instructions executable by the processor, and when the electronic device is running, the processor and the memory communicate with each other through the bus, and the machine-readable instructions, when executed by the processor, perform operations comprising:

determining a number of buckets based on estimating a data volume for each of a plurality of time partitions and allocating the number of buckets in advance for each time partition based on the estimated data volume, wherein each bucket is associated with one storage space of a target storage system;

acquiring at least one piece of feature data to be stored in the target storage system, wherein each piece of the feature data comprises at least one sub-feature data, the at least one sub-feature data comprises usage behavior data of a user using an application, and each piece of the feature data has a corresponding primary key that is a unique identifier of each piece of the feature data;

for each piece of the feature data, determining, from the plurality of time partitions, a target time partition to which an occurrence time of the feature data belongs; and allocating, based on a number of buckets preset for the target time partition and a primary key corresponding to the feature data, a corresponding bucket to the feature data, and storing the feature data in a storage space that is associated with the corresponding bucket.

13. The electronic device according to claim 12, the operations further comprising:

in a case that a current time satisfies a preset condition, dividing a first preset time period after the current time into the plurality of time partitions; and setting a corresponding number of buckets for each time partition according to corresponding festival attribute information of each time partition, or setting a corresponding number of buckets for each time partition according to data storage capacity of a second preset time period before each time partition.

14. The electronic device according to claim 12, the operations further comprising:

performing, based on the total number of buckets corresponding to the target time partition, a modulo operation on the primary key of the feature data to obtain an identity identifier of the corresponding bucket of the feature data; and allocating, based on the identity identifier, the corresponding bucket for the feature data from a corresponding number of buckets of the target time partition.

15. The electronic device according to claim 12, the operations further comprising:

for each piece of the feature data, in a case that the feature data does not carry the occurrence time, performing a global index on buckets configured by the target storage system based on the primary key of the feature data, to determine whether a target bucket corresponding to the primary key of the feature data exists among the buckets configured by the target storage system; and in a case that the target bucket corresponding to the feature data exists among the buckets configured by the target storage system, storing the feature data into a storage space that is associated with the target bucket.

16. The electronic device according to claim 12, wherein after storing the feature data in the storage space that is associated with the corresponding bucket of the feature data, wherein the operations further comprise:

acquiring a data reading task, and determining, based on the data reading task, at least one bucket in which target sub-feature data to be read is located;

dividing the data reading task into a plurality of sub-data reading tasks based on the at least one bucket in which the target sub-feature data is located; and for each of the sub-data reading tasks, performing a merged reading of data by employing a K-way merge algorithm.

17. The electronic device according to claim 12, wherein feature data stored in a same bucket during a same period fall into a same data file, and the operations further comprise:

performing data merging on data files in the target storage system according to a first range to obtain at least one first merged data file; and/or performing data merging on the data files in the target storage system according to a second range to obtain at least one second merged data file, in which the second range is greater than the first range.

18. The electronic device according to claim 12, wherein the usage behavior data comprises sample data and sample label data, and the sample data and the sample label data are used to train a model.

19. A non-transitory computer-readable storage medium, storing a computer program, wherein the computer program, when executed by a processor, causes the processor to implement operations comprising:
  determining a number of buckets based on estimating a data volume for each of a plurality of time partitions and allocating the number of buckets in advance for each time partition based on the estimated data volume, wherein each bucket is associated with one storage space of a target storage system;
  acquiring at least one piece of feature data to be stored in the target storage system, wherein each piece of the feature data comprises at least one sub-feature data, the at least one sub-feature data comprises usage behavior data of a user using an application, and each piece of the feature data has a corresponding primary key that is a unique identifier of each piece of the feature data;
  for each piece of the feature data, determining, from the plurality of time partitions, a target time partition to which an occurrence time of the feature data belongs; and allocating, based on a number of buckets preset for the target time partition and a primary key corresponding to the feature data, a corresponding bucket to the feature data, and storing the feature data in a storage space that is associated with the corresponding bucket.

\* \* \* \* \*